Sept. 8, 1936.   F. T. WILCOX   2,053,755
BOAT
Filed June 7, 1935   4 Sheets-Sheet 1
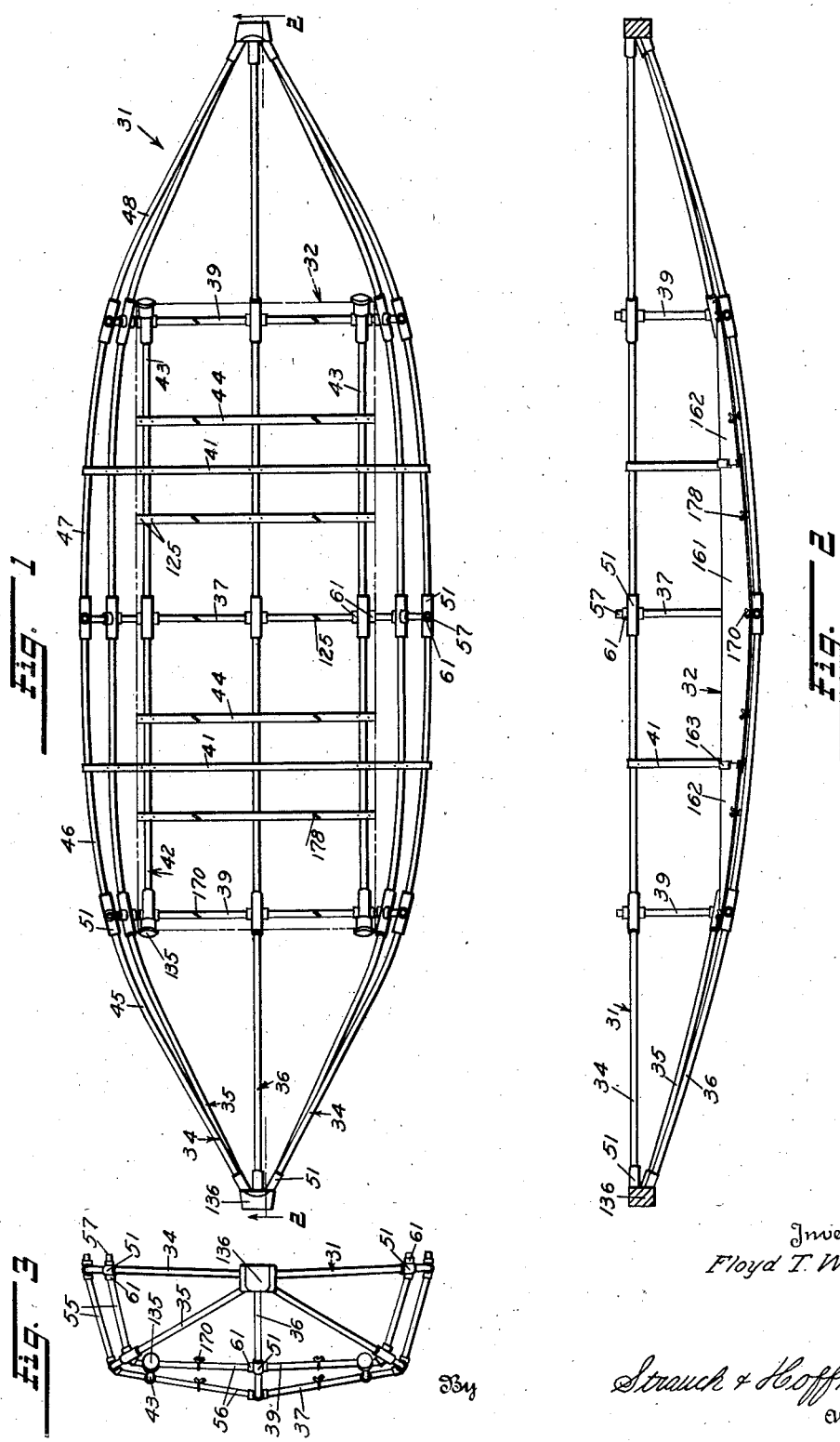
Inventor
Floyd T. Wilcox
By Strauch & Hoffman
Attorneys

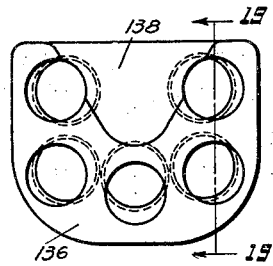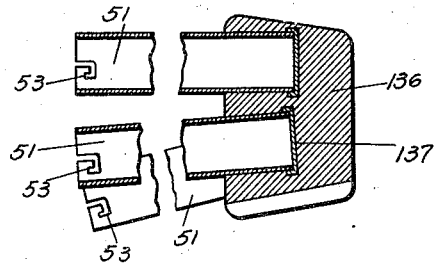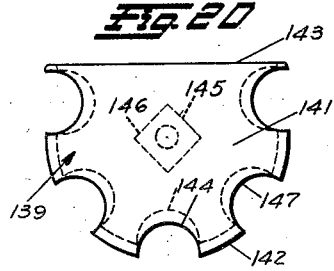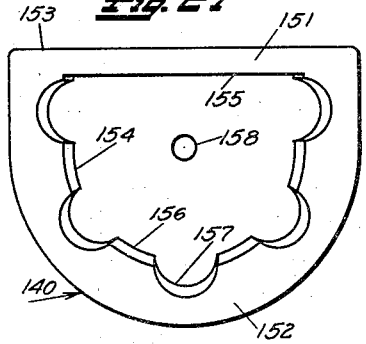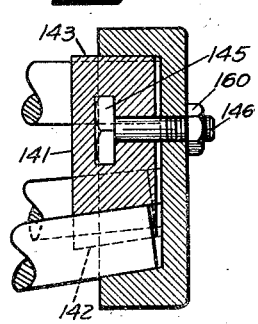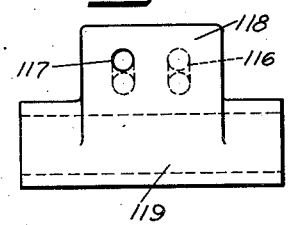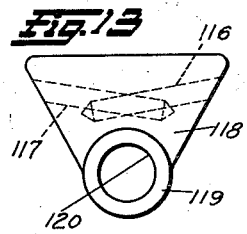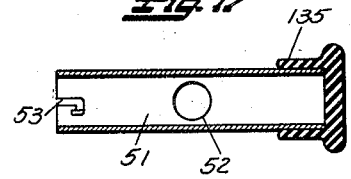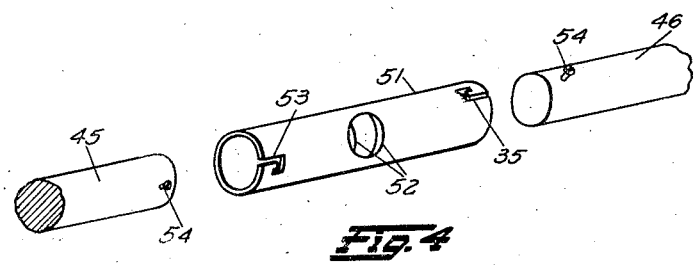

Sept. 8, 1936.    F. T. WILCOX    2,053,755
BOAT
Filed June 7, 1935    4 Sheets-Sheet 3
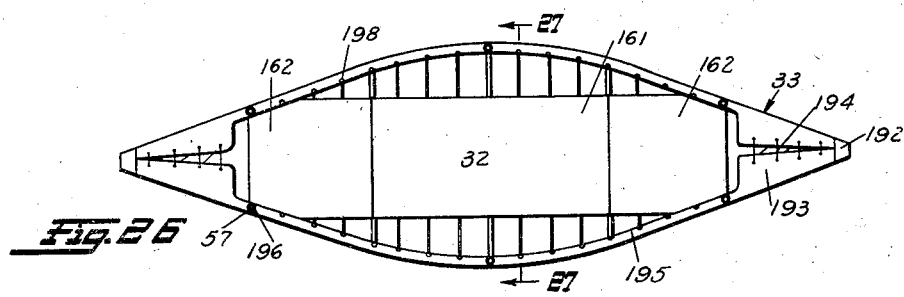
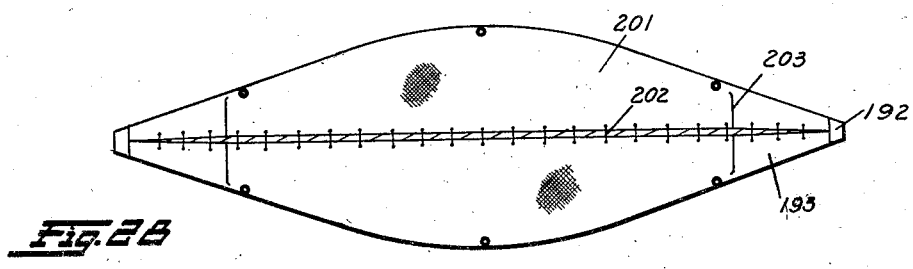
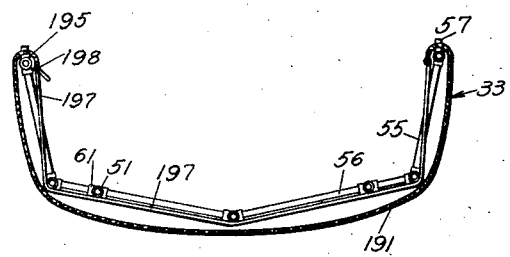
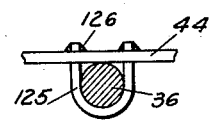
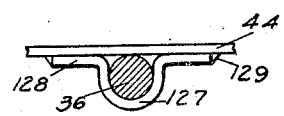
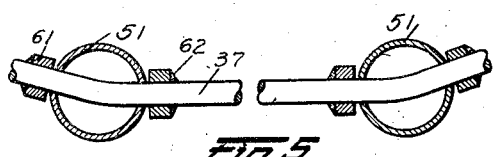
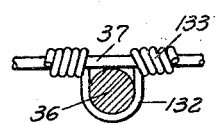
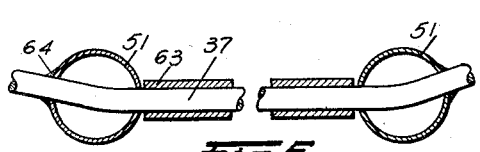
Inventor
Floyd T. Wilcox
By Strauch & Hoffman
Attorneys Sept. 8, 1936. F. T. WILCOX 2,053,755
BOAT
Filed June 7, 1935 4 Sheets-Sheet 4
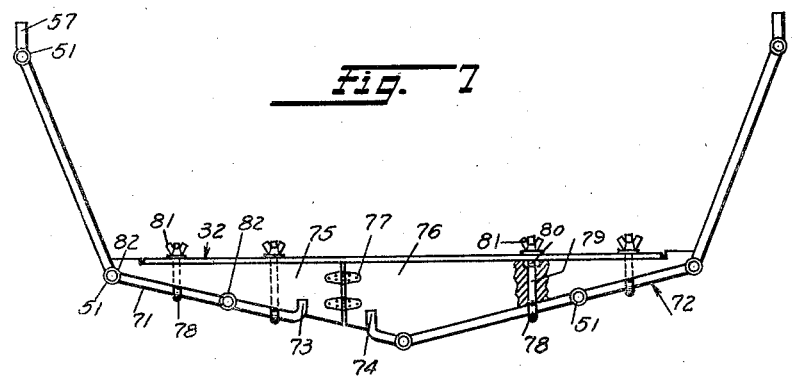
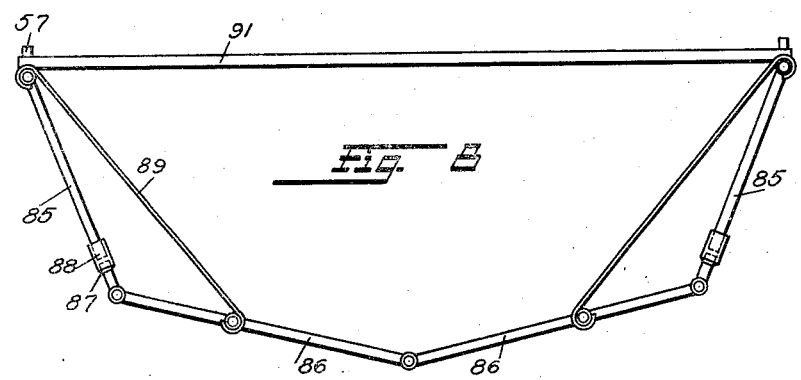
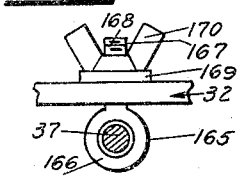
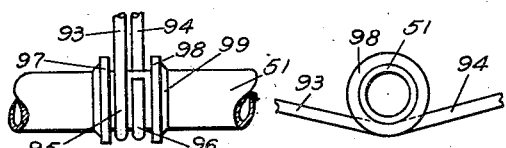
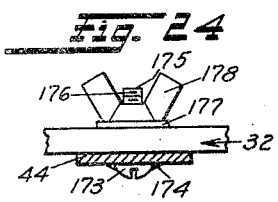
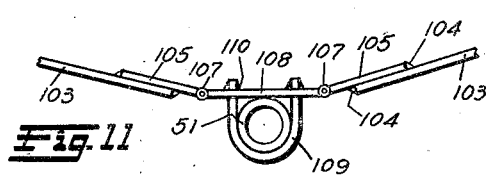
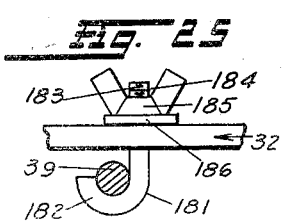
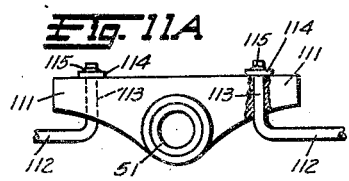
Inventor
Floyd T. Wilcox
Strauch & Hoffman
Attorneys Patented Sept. 8, 1936

2,053,755

UNITED STATES PATENT OFFICE 2,053,755

BOAT

Floyd T. Wilcox, Schenectady, N. Y., assignor to Thomas Henry Wilcox, Schenectady, N. Y.

Application June 7, 1935, Serial No. 25,494

3 Claims. (Cl. 9—2)

This invention relates to collapsible boats and particularly to that class of boats formed from a plurality of detachable sections which upon dismantling may be compactly and conveniently transported.

In collapsible boats of this type there are three principal requirements or desirable factors which govern the construction. Primarily, the sections of the boat when assembled must comprise a strong and rigid structure which in use will be durable and provide a sufficient factor of safety for users of the boat. In the second place, the sections of the boat when dismantled should be adapted for collection together into a compact and lightweight bundle which will provide facility of transportation. The third controlling factor is the necessity for providing a construction which will insure ease and facility in the execution of the assembling and dismantling operations.

In prior devices of the class described, it has been found necessary in order to assure a construction which will have the requisite strength and rigidity when assembled, to provide individual sections which upon dismantling are bulky, heavy and ill-suited to compact nesting for purposes of transportation. Attempts to provide individual sections which may be nested into a compact and lightweight bundle for transportation have resulted in the production of a structure which embodies an excessive and impractical number of such individual sections with the result that the boat assembled therefrom is lacking in the strength and rigidity requisite to practical use. In addition, such prior devices have failed to produce a sectional boat structure which may be rapidly and easily assembled and dismantled, while at the same time insuring that the boat when assembled will not be subject to inadvertent dismantling under the shocks and strains impressed upon the assembled construction in use.

The present invention seeks to overcome these difficulties and it is therefore a primary object of the present invention to provide a collapsible boat which shall when assembled afford a rigid, strong and durable construction, and which shall afford a maximum factor of safety to passengers using the boat.

A further object resides in the provision of a collapsible boat which shall be light and compact when dismantled for transportation.

A still further object resides in the provision of a collapsible boat which shall be formed from a minimum number of detachable units or sections.

Still a further object of the present invention resides in the provision of a collapsible boat construction embodying a minimum number of non-interchangeable parts, thereby facilitating repair and decreasing the costs of production of the boat.

A still further object resides in the provision of a collapsible boat construction which will insure ease and facility in assembling and dismantling the individual sections.

Another object of the present invention resides in the provision of a collapsible boat which shall when assembled afford a construction of maximum strength and rigidity, and when dismantled shall afford a nested parcel providing maximum portability.

Further objects and advantages of the invention will appear in the following description made with reference to the accompanying drawings in which:

Figure 1 is a top plan view of the boat skeleton forming a part of the present invention.

Figure 2 is a longitudinal vertical sectional view taken substantially on line 2—2 of Figure 1.

Figure 3 is an end elevational view of the skeleton shown in Figure 1 as seen when viewed from the left end of Figure 1, parts of the structure being omitted for clarity of illustration.

Figure 4 is an isometric view showing a preferred method of interlocking the aligned sections forming part of the skeleton illustrated in Figure 1.

Figure 5 is a fragmental sectional view illustrating one method of spacing the interlocking ferrules of Figure 1 upon the transverse rib sections.

Figure 6 is a similar view illustrating a modified form of the construction shown in Figure 5.

Figure 7 is an elevational view of a modified form of transverse rib section and floor support forming a part of the present invention.

Figure 8 is a similar view of a further modified form of transverse rib section together with reinforcing structure therefor.

Figure 9 is a fragmental elevational view illustrating a modified form of hinged keel joint for a tubular transverse rib section forming part of the present invention.

Figure 10 is a view as seen when observing Figure 9 from the right side thereof.

Figure 11 is a view similar to Figure 9 illustrating a hinged keel joint for a flat strap transverse rib section.

Figure 11A is a view similar to Figure 11 and illustrates a modified form of hinged keel joint.

Figure 12 is a view in side elevation of a keel clamp for interlocking the adjoining ends of a modified dual section transverse rib member.

Figure 13 is a view as seen when observing Figure 12 from the right side thereof.

Figure 14 is a fragmental view showing the method of interconnecting the latticed sections forming a part of the boat skeleton illustrated in Figure 1.

Figures 15 and 16 illustrate modified forms of the construction shown in Figure 14.

Figure 17 is a longitudinal sectional view of a free end ferrule and protecting cap forming a part of the invention as illustrated in Figure 1.

Figure 18 is a front elevational view of the bow or stern block designed to interlock the free ends of the longitudinal skeleton ribs illustrated in Figure 1.

Figure 19 is a sectional view taken substantially on line 19—19 of Figure 18.

Figures 20 and 21 illustrate respectively the male and female elements of a modified form of bow or stern block.

Figure 22 is a transverse sectional view of the male and female elements of Figures 20 and 21 when in assembled relation.

Figures 23, 24, and 25 illustrate alternate constructions for securing the boat flooring of the present invention to the skeleton sections illustrated in Figure 1.

Figure 26 is a diagrammatic top plan view illustrating the boat covering mounted upon the skeleton, parts of the skeleton being omitted for clarity of illustration.

Figure 27 is a transverse sectional view taken substantially on line 27—27 of Figure 26, the boat cover being drawn only partly taut over the boat skeleton.

Figure 28 is a top plan view of a modified boat covering provided with flaps for forming a complete deck.

Referring now to the drawings and particularly to Figures 1, 2, and 3 it will be seen that the present invention embodies a collapsible boat which when assembled is symmetrically constructed with respect to its longitudinal and transverse axes, either end of the boat construction being adapted for use indiscriminately as the bow or stern. Such universal construction provides a great advantage by virtue of the fact that interchangeability of the individual parts is increased and the number of parts differing in construction is diminished with the result that costs of manufacture and replacement are reduced to a minimum. Furthermore, such construction affords a wider scope of practical use for the boat and greatly aids the ease and facility with which the boat may be maneuvered.

The preferred embodiment of my invention comprises a skeleton or framework 31, a flooring unit 32 and a cover 33 (as seen in Figure 26) formed of canvas or other suitable material impermeable to water. Cover 33 has been omitted from Figures 1, 2, and 3, and flooring section 32 has been omitted from Figure 3 to clarify the illustration.

The boat skeleton 31 comprises a plurality of longitudinal ribs including gunwale ribs 34, chine ribs 35 and a keel rib 36 which are interlocked, in a manner presently to be set forth, with a plurality of transverse ribs including a central rib 37, end ribs 39 and auxiliary ribs 41. The boat skeleton 31 further comprises a cradle section 42 interlocked with respect to the rib construction above described and including longitudinal stringers 43 and transverse floor supports 44. Auxiliary transverse ribs 41 and floor supports 44 have been omitted from Figure 3 to clarify the illustration.

As clearly seen in Figure 1, each of the longitudinal rib members 34, 35, and 36, and each of the longitudinal stringer members 43 comprises a series of individual rod sections disposed end to end. For example, each gunwale section 34 comprises rod sections 45, 46, 47, and 48. Preferably the individual rod sections are formed from wood, although if desired metallic tubing or other suitable material may be employed. Adjoining ends of the individual rod sections forming the longitudinal ribs and stringers are joined together by means of ferrules 51 which are pivoted at spaced intervals on the central transverse rib 37 and the end transverse ribs 39 in a manner presently to be set forth.

As seen in Figure 4, each ferrule 51 is in the form of a cylindrical sleeve, being provided with aligned transverse openings 52 in the walls thereof to allow the same to be mounted upon one of the transverse rib members. Each end of each ferrule 51 is provided with hook-shaped notches 53 of a bayonet joint type which are disposed out of axial alignment, the hook portions of the opposing notches extending in circumferentially opposite directions.

Adapted to be received within notches 53, are suitable projections 54 formed on adjoining ends of the individual rod sections, for example, adjacent sections 45 and 46. In the preferred form of my invention projections 54 may take the form of wood screws or the like threaded into the sections which as previously described preferably comprise wooden members. If, however, the individual rod sections take the form of tubular metallic elements or the like, projections 54 may be formed by inserting cotter pins in suitable apertures near the ends of the rod sections (not shown) or may be formed by bending radially outward one end of a wire coiled about the end of each dowel section (not shown).

In the assembling operation projections 54 near the ends of adjoining rod sections are inserted into their corresponding notches 53 formed in the ferrule and the adjoining sections are then twisted in opposite directions with the result that projections 54 are securely retained within notches 53 and any opposing torques to which adjoining rod sections are subjected are effective to prevent inadvertent dismantling of said sections.

As ferrules 51 are freely pivoted upon the transverse ribs, it will be seen that in assembling the boat skeleton the ferrules may readily be rotated into correct alignment with the rod sections to be therein inserted, with resulting increase in ease of assembly, and with the further result that when assembled the ferrules may adapt themselves to the rib contour thus relieving at the rib joints the strain which would result from fixed joints. Furthermore, when nesting the dismantled parts of the boat for transportation, the ferrules may be rotated to lie flat in the plane of the ribs thereby increasing the compactness and portability of the dismantled structure.

Central transverse rib 37 and end transverse ribs 39 are preferably formed from rod material, each rib as seen in Figure 3 affording dual riser portions 55 and dual base portions 56, the riser and base portions being substantially straight, thereby providing angular joints between said portions. The ends of each transverse rib extend upwardly slightly beyond gunwale 34 thereby forming studs 57.

Pivotally disposed upon each apex and upon each base portion of the central and end transverse ribs is one of the ferrules 51. As seen in Figure 5, which illustrates a fragment of the transverse rib 37, each ferrule is retained in proper position upon its transverse rib by means of nipple members 61 disposed to each side of ferrule 51 and welded upon the transverse rib as indicated at 62. The ferrules are thus inhibited from sliding longitudinally with respect to the transverse rib upon which they are mounted, while at the same time being allowed to freely pivot thereabout.

It is to be understood that ferrules 51 may be welded rigidly upon the transverse ribs to provide fixed joints in the boat framework and lend rigidity thereto.

Figure 6 illustrates an alternate construction for restraining ferrules 51 in proper position upon the transverse ribs and constitutes a series of sleeve members 63 disposed concentrically about the transverse rib and extensive between adjacent ferrules, sleeves 63 being thus effective to prevent relative movement of adjacent ferrules 51 with respect to each other. Each gunwale ferrule 51 is prevented from slipping over the end of its transverse rib by welding 64 or in any other suitable manner, as for example by means of nipples similar to nipples 61 shown in Figure 5.

Figure 7 illustrates a further modified construction for retaining ferrules 51 in proper disposition upon the transverse ribs. In this construction the transverse rib instead of being formed as one continuous member is composed of two segments 71 and 72, the free adjacent ends of which are disposed to one side of the keel rib 36, and as indicated at 73 and 74 are bent vertically upward. Disposed above the base portions of rib sections 71 and 72 are floor support sections 75 and 76 respectively, which are hinged about a vertical axis as indicated at 77 between the free adjacent ends 73 and 74 of the transverse rib. Floor support sections 75 and 76 are preferably of slightly greater thickness than the transverse ribs, and are thereto secured by means of eye bolts each having an eye portion 78 accommodating the transverse rib below the floor support, and a shank 79 extending upwardly through aligned apertures in the floor support and flooring section, a locknut 80 being threaded on shank 79 below the flooring section. Wing nuts 81 are threaded onto the ends of eye-bolt 78 and serve to rigidly interlock the transverse rib sections 71 and 72, the floor support sections 75 and 76, and the flooring section 32 into a unitary assembly. Floor support sections 75 and 76 are provided with arcuate recesses 82 designed to receive ferrules 51 and retain the same in proper position upon the transverse rib. It will be appreciated that by providing floor supports 75 and 76 above the central transverse rib and each of the end transverse ribs, the ferrules 51 thereon disposed will at all times when the boat is assembled be retained in proper position. By virtue of the fact that such modification of the transverse rib is formed in two sections 71 and 72, it will be appreciated that upon dismantling the boat construction the transverse rib may be nested compactly for transportation.

It is further to be noted that since the flooring sections 75 and 76 are hinged together, upon dismantling of the boat said floor support sections may also be arranged compactly by swinging said sections together.

Figure 8 illustrates a modified form of transverse rib construction comprising dual individual riser sections 85 and a unitary base section 86. Welded onto each end of the rib base portion 86, as indicated at 87, is a cylindrical sleeve 88. Sleeves 88 are designed to receive the ends of riser portions 85 which may be therein secured in any suitable manner.

An angle brace 89 formed of strap metal or the like is provided to extend between the gunwale ferrule and the longitudinal stringer ferrule on each side of the transverse rib assembly, the ends of strap 89 being bent around said ferrules. Straps 89 act to brace the angular joints of the transverse rib assembly and to insure that riser portions 85 are retained in correctly assembled relation with respect to base portions 86 of the transverse rib. Extending transversely between studs 57 of the transverse rib projecting above the gunwale is a brace or tie rod 91 formed of strap material or the like and designed to strengthen the transverse rib assembly against spreading under severe loads. Braces 89 and 91 are effective to lend increased strength and rigidity to the transverse rib assembly and to insure that excessive loads and severe stresses imposed upon the assembly in use will not be effective to cause failure or harmful distortion of the transverse rib assembly. Also by virtue of the facts that the transverse rib is formed in a plurality of sections and that the braces 89 and 91 each comprise an individual section, the entire assembly when dismantled will be adapted for compact nesting.

It is to be understood that braces 89 and 91 are not limited in application to the transverse rib construction illustrated in Figure 8, but may be equally well applied to any other form of transverse rib construction for purposes of reinforcement, and it will be further understood that such brace may be applied to any or all of the transverse ribs forming a part of the boat skeleton.

A further modified construction of a sectional transverse rib is illustrated in Figures 9 and 10 wherein dual rib sections 93 and 94 are provided, the adjacent ends of the rib sections being bent around the keel ferrule in opposite directions as indicated at 95 and 96 respectively, thereby allowing the dual sections to be hinged about the keel ferrule with respect to each other. Improper longitudinal displacement of the rib sections with respect to the keel ferrule is prevented by means of collars 97 and 98 positioned upon the keel ferrule to each side of the hinged ends of the rib sections and mounted securely upon the keel ferrule in any suitable manner as, for example, by means of welding 99.

The dual rib sections 93 or 94 may be either of the cylindrical rod type or of the flat strap type, either form being well adapted to use in the construction just set forth. Such construction permits the dual rib sections to be folded together compactly upon dismantling of the boat structure.

Figure 11 illustrates still a further method of forming a transverse rib section which comprises dual rib portions 103 secured by welding 104 or the like to leaves 105 which are hinged as indicated at 107 to a plate 108. Plate 108 is designed to be disposed superjacent a keel ferrule 51 and is designed to be interlocked with respect thereto by means of a U-bolt 109 which extends beneath the keel ferrule and upwardly through plate 108 and is thereto secured in any suitable manner as for example by means of welding 110 or the like.

The present construction is particularly adapted for use with transverse rib members formed from flat strap material or other material which is not adapted for pivotally supporting ferrules 51. It will be appreciated that such hinged construction allows the rib sections 103 and 104 when dismantled to be folded together into a compact unit for purposes of transportation.

In Figure 11A is illustrated a modified form of hinged keel joint comprising a keel clamp having a central portion designed to receive a keel ferrule 51, and lateral extensions 111 provided with vertical bores for accommodating the keel ends of duplicate transverse rib sections 112 which are bent vertically upward as indicated at 113. Rib sections 112 are prevented from withdrawal from lateral extensions 111 in any suitable manner, for example by means of washers 114 welded as indicated at 115 to the ends of bent portions 113. It will thus be seen that rib sections 112 may hinge about the keel clamp and be folded compactly together when dismantled, but may not be inadvertently disengaged from the keel clamp under any conditions.

If desired, each transverse rib may be made in dual sections, the adjacent ends of which are designed to be received and retained within bores 116 and 117 (Figures 12 and 13) formed within a block 118 provided with a collar 119 having a bore 120 designed to receive a keel ferrule. Bores 116 and 117 are illustrated as being cylindrical in shape, but any desired shape or form may be employed to conform with the shape of the material used in forming the dual sections of the transverse ribs. By such construction, when the transverse rib is dismantled, the dual sections may be individually withdrawn from block 118.

From the structure thus far described, it will be observed that the longitudinal ribs and the longitudinal stringers are each formed from a series of individual rod sections interlocked together in assembled relation by means of ferrules 51. It will be further observed that transverse ribs 37 and 39 may each be formed either from a single piece of material or in a plurality of individual sections interlocked together in one of the several alternate constructions above described. The preferred form of transverse rib illustrated in Figure 1 will, when the boat assembly is dismantled, be seen to comprise a polygonal rib upon which are pivoted at spaced intervals a series of ferrules.

In order to assemble the longitudinal ribs and stringers together with the central and end transverse ribs, it is necessary only to interlock the individual rod sections with respect to the corresponding ferrules mounted on the transverse ribs by the simple inserting and twisting operation described in connection with Figure 4.

Auxiliary transverse ribs 41 and transverse floor supports 44 may be formed from any suitable material as for example from rod, tubing or from flat strap material, the interlocking with respect to the cylindrical rod sections of the longitudinal ribs being effected in the manner now to be set forth and the ends of the auxiliary transverse ribs being bent around the gunwale.

Figure 14 illustrates a construction for interlocking a cylindrical longitudinal rib with respect to a transverse strap member. In this figure keel 36 is supported beneath a floor support 44 by means of a U-bolt 125 which extends beneath keel 36, the legs of the U-bolt extending vertically upward through floor supports 44, being thereto secured in any suitable manner as for example by means of welding 126 or the like.

In Figure 15 is shown an alternate construction similar to that just described, whereby keel 36 is supported beneath floor supports 44 by means of a sling 127 provided with arms 128 disposed below floor support 44 and thereto secured in any suitable manner, for example, by means of welding 129 or the like.

If desired, sling 127 may be formed from relatively wide strap material and arms 128 thereof, instead of being bent in the plane of member 44 may extend vertically upward, each leg 128 being provided with an aperture for accommodating the transverse member 44. Sling 127 may be either welded or freely mounted upon the transverse member 44. By such construction slings 127 may be mounted upon either rod or flat strap transverse members.

Figure 16 illustrates a further construction similar to those of Figures 14 and 15 whereby a cylindrical transverse member, as for example central transverse rib 37, may be supported with respect to a longitudinal cylindrical member, as for example keel 36, without intersection of the cylindrical elements. This construction embodies a sling 132 extending below keel 36, the free ends of the sling being coiled about rib 37 as indicated at 133.

By means of the construction just described in connection with Figures 14, 15, and 16, the interlacing members of the boat framework 31 may be interlocked securely together upon assembly while at the same time allowing dismantling of said sections with facility, inasmuch as the sling members depending from the transverse sections allow the longitudinal sections to be readily withdrawn therefrom.

The free end of each ferrule disposed at the extremities of the stringers 43 is covered as seen in Figures 1 and 17 by means of a snubber cap 135 formed from any suitable resilient material, as for example rubber or the like. The snubber cap 135 serves to prevent the boat cover 33, stretched over the skeleton 31, from rubbing and wearing against the free ends of the ferrules.

Disposed at each end of the boat skeleton is a bow or stern block 136 (Figures 18 and 19) into which are cast the ends of a cluster of ferrules 51 each of which is provided with a cap 137, the other ends of said ferrules extending outwardly from said block 136 for receiving and interlocking the bow and stern ends of the longitudinal rib members. Each block 136 may be provided with a recess 138 for purposes of ornamentation and to reduce weight, as seen in Figure 18, from which figure ferrules 51 have been omitted to clarify the illustration. Blocks 136 thus serve to restrain the ends of the longitudinal ribs in proper bow and stern contour, while at the same time lending strength and rigidity to the boat skeleton.

A modified form of bow or stern block assembly is illustrated in Figures 20, 21, and 22 and comprises a male member 139 adapted to mate within a female member 140 for locking together the bow and stern ends of the longitudinal ribs, which are preferably inserted directly into the bow or stern block assembly. It will be appreciated, however, that the ends of the longitudinal ribs before being inserted into the bow or stern block assembly may be capped with ferrules, if desired. As illustrated in Figure 20, male member 139 comprises a main body portion 141 provide with a substantially semi-circular wall 142 and a top flat wall 143. Wall 142 as indicated at 144 is provided with an axial taper, whereas top flat wall 143 is normal to the front and rear faces of the male member. Embedded within body portion 141 of the male member is the head 145 of a bolt 146 which extends outwardly to the rear of body portion 141. Formed in the peripheral wall 142 of male member 139 is a plurality of semi-circular notches 147.

As seen in Figure 21, the female member 140 comprises a main body portion 151 provided with a substantially semi-circular external wall 152 and a flat top wall 153. Provided within the body portion 151 is a well 154 having a top wall 155 complementary to top wall 143 of the male member, and a substantially semi-circular wall 156 complementary to wall 142 of the male member and provided with a similar axial taper. Wall 156 of the well 154 is provided with a plurality of semi-circular notches 157 which are complementary to notches 147 formed in the male member. An aperture 158 is formed in the end wall of female member 140 for accommodating bolt 146 provided on male member 139.

As seen in Figure 22, the end rods of the longitudinal ribs may be assembled with respect to the male and female members 139 and 140 respectively by first loosely fitting together the male and female members with bolt 146 on the male member extending through aperture 158 in the female member, and then disposing the ends of the rods within the substantially circular openings formed by the complementary notches 147 and 157 formed in the male and female members respectively. A lock nut 160 may then be threaded on the end of bolt 146 extending beyond the aperture 158 in the female member and upon tightening nut 160 the male member will be drawn more intimately within the female member with the result that the walls of notches 147 in the male member will be drawn closer to the walls of complementary notches 157 in the female member, and the rods will be firmly clamped therebetween. Such clamping action takes place by virtue of the axial taper with which the walls of notches 147 and 157 are provided, relative longitudinal reciprocation between the male and female members being effective to vary the normal distance between the bottoms of notches 147 and 157, thus by proper adjustment of lock nut 160, allowing the rods to be firmly clamped between the male and the female members.

By this construction it is possible to readily dismantle the rods from association with the bow or stern block, thereby allowing compact nesting of the dismantled boat construction and increasing facility of transportation.

It is to be understood that if desired the skeleton of the boat embodying the present invention instead of assuming the form illustrated in Figure 1 may include additional longitudinal ribs, transverse ribs, stringers, or floor supports and such alternate construction is intended to be embraced within the present invention.

It will be observed that by varying the length of the rods from which the longitudinal ribs and stringers are formed and by varying the shape of the transverse ribs, the size and shape of the boat skeleton may be materially altered. Furthermore by varying the number of individual rod sections employed to form a single rib and by altering the number of transverse ribs, it will be appreciated that the length of the boat may be readily varied. Such convenient and readily executed alteration in the size, shape and capacity of the assembled boat secures a distinct advantage to the present construction by virtue of the fact that the manufacturer of such boat may, upon demand, supply boats meeting particular specification requirements as to size, shape and capacity without the necessity of materially altering the form of the individual units from which the complete boat is assembled and as a result, costs of production are reduced to a minimum. The owner of a collapsible boat embodying the present invention may readily alter the size, shape and capacity of his boat to meet the needs of particular circumstances by merely substituting or adding alternate rod units to the construction. Also, by virtue of the fact that rods of substantially equal length and diameter are employed throughout the construction, such rods are completely inter-changeable, and facility of assembling the boat skeleton is thus greatly enhanced.

Referring now to the flooring unit 32 of the boat, as seen in Figure 2, flooring 32 preferably comprises a main section 161 and two auxiliary sections 162 secured in overlapping relation to the main section by means of hinges 163 or the like. By this construction the flooring when dismantled from the boat skeleton may be formed into a compact unit by the simple operation of folding auxiliary floor sections 162 into overlying relation with main section 161.

When assembling the flooring section within the boat skeleton, the flooring originally comprises a flat unit which contacts the boat skeleton only at the edges of the flooring unit, the central area of the flooring being suspended above the cradle unit 42 of the boat skeleton. However, upon being interlocked with respect to the boat skeleton, the central area of the flooring section is sprung downwardly into contact with the cradle 42 of the boat skeleton, and the flooring section thereby assumes the contour of the cradle section. The flooring section is interlocked with respect to the boat skeleton by means of the construction now to be described.

Central transverse rib 37 and end transverse rib 39 are provided at suitable points with eye bolt and wing nut assemblies 165 illustrated in detail in Figure 23. Each eye bolt comprises an eye portion 166 adapted to fit about one of the cylindrical transverse ribs, for example, central rib 37, as shown in Figure 23. Extending upwardly from eye portion 166 is a stud portion 167 designed to extend through flooring unit 32 and the upper extremity of which is threaded as indicated at 168. Disposed concentrically about stud bolt 167 superjacent the flooring section 32 is a washer member 169 against which bears a wing nut 170 threaded onto extremity 168 of the eye bolt.

It will be appreciated that by proper adjustment of wing nut 170, flooring unit 32 may be sprung into the region adjacent the transverse rib 37, the eye bolt and wing nut serving as a rigid construction for interlocking the flooring section with respect to the boat skeleton.

Floor supports 44 are likewise provided with suitable stud bolt assemblies as seen in Figure 24. Each of said assemblies preferably comprises a machine screw having a head 173 welded to the bottom of a floor support 44 as indicated at 174, and a shank 175 extending upwardly through and beyond strap 44 and floor unit 32, the upper extremity of said shank 175 being threaded as indicated at 176. Disposed concentrically about shank 175 superjacent floor unit 32 is a washer 177 against which bears a wing nut 178 threaded onto shank 175.

By proper manipulation of wing nut 177, flooring unit 32 may be sprung into contact with floor supports 44, the assembly thus serving as a secure interlock between the flooring unit and floor supports.

It will be appreciated that by the constructions illustrated in Figures 23 and 24, the wing nuts must be removed completely from their respective bolts when it is desired to assemble or dismantle the floor unit 32 with respect to the boat skeleton, by virtue of the fact that the bolt and wing nut assemblies are at all times associated permanently with the transverse ribs and floor supports. In Figure 25 there is illustrated a construction whereby bolt and wing nut assemblies may be permanently attached to the flooring unit and may be secured with respect to the transverse ribs and floor supports upon assembly or dismantling of the boat without necessitating the removal of the wing nut from the bolts, but by merely adjusting the wing nuts on the bolts without removal.

This construction embodies a bolt 181 provided with a hook portion 182 and a stud shank 183. Shank 183 is adapted at all times to be disposed within a suitable aperture in the flooring section, the threaded end 184 of the shank extending upwardly beyond the flooring section. A wing nut 185 is threaded onto the end of the hook bolt and into contact with a washer 186 disposed superjacent the flooring section.

Upon assembling the flooring section with respect to the boat skeleton, the hook portion 182 of bolt 181 may be hooked beneath the floor supports 44 or, as illustrated in Figure 25, beneath the transverse rib as for example transverse rib 39, without necessitating removal of the wing nut 185 from shank 183. By proper manipulation of wing nut 185, the flooring section 32 may be interlocked securely with respect to the transverse rib or floor support.

If desired the washers described in Figures 23, 24 and 25 may each be welded to its respective wing nut to form a unitary wing nut and washer assembly.

As previously described, when flooring section 32 is initially positioned with respect to the boat skeleton, the central area of the flooring section is not in contact with the boat skeleton by virtue of the fact that at such time the flooring unit extends in a horizontal plane contacting the boat skeleton only at the ends and sides of the flooring unit. However, as the central area of the flooring section is sprung downward and secured with respect to the boat skeleton, it will be appreciated that the stress set up within the flooring section is effective to act as a brace to the boat skeleton and lend rigidity and increased strength thereto.

The preferred form of boat cover 33 forming a part of the present invention is illustrated in Figures 26 and 27, the latter figure showing the boat cover during the assembling operation and prior to being drawn completely tight over the boat skeleton.

The boat cover comprises a main body portion 191, nose pockets 192 designed to be disposed over the bow and stern blocks 136, decks 193 adapted to be secured by means of lacing 194 above the bow and stern of the boat, and a flap portion 195 adapted to overlap the gunwale. Provided in flap portion 195 are metallic rings or grummets 196 adapted to fit over studs 57 formed by the projection of the transverse ribs above the gunwale. Provided in the edge of flap portion 191 are a series of metallic rings or grummets 198, a rope 197 extending between corresponding grummets on the opposing flaps, and passing beneath the longitudinal rib and stringer members. As seen in Figure 27, rope 197 is secured firmly to a grummet on one flap 195 and is passed slidably through the corresponding grummet in the opposite flap 195, and upon being drawn tight is effective to stretch and securely lash the cover 33 tightly over the boat skeleton.

It will thus be appreciated that laces 194 and ropes 197, upon being drawn taut, are effective to securely fit boat cover 33 over the skeleton and retain the same in assembled relationship with the skeleton, and such action is supplemented by the disposition of grummets 196 over the transverse rib studs 57.

In Figure 28 there is illustrated a modified boat cover construction providing wide flap portions 201 which may, when desired, be secured together by means of lacing 202 to form a complete deck above the boat skeleton. Slits 203 are provided between decks 193 and flaps 201 for allowing the flaps to be folded back to the gunwale when in use. Such construction is desirable when it is found necessary to store the assembled boat and protect the same against deterioration.

The method of assembling the boat construction will now be set forth. Longitudinal rod sections may first be passed through the U-bolts slung beneath the transverse auxiliary ribs 41 and the transverse floor supports 44. The centrally extending ends of said longitudinal rod sections may then be interconnected with the ferrules pivoted upon the central transverse rib 37, by inserting projections 54 on the rods within notches 53 in the ferrules and twisting the rods into locked relation as described in connection with Figure 4. The remote ends of the longitudinal rod sections may then be interconnected with the ferrules pivoted upon the end transverse ribs 39. The boat skeleton will then be completely assembled with the exception of the bow and stern portions.

The end rods of the longitudinal ribs may next be assembled in the ferrules mounted in end transverse ribs 39, and the free ends of these rods may then be brought together and assembled within their respective bow or stern block assemblies.

The flooring section 32 may next be disposed within the boat skeleton above the cradle section 42, and the ends of the floor section may be secured with respect to the end transverse ribs 39. The central portion of the flooring section may then be sprung downwardly into contact with the cradle part of the boat skeleton and secured with respect thereto by means of the bolt and wing nut assemblies hereinbefore described.

The boat thus far assembled may next be set into the boat cover 33 and the cover noses 192 pulled up and snapped over the bow and stern ends, the grummets 196 then being snapped over the transverse rib ends 57. The decks 193 may then be laced together and the flaps 155 lashed over the gunwale by means of ropes 197 in the manner previously described, thus drawing the boat cover tightly over the skeleton.

The boat structure as thus assembled will comprise a construction of great strength and rigidity. As previously described the rod sections of the boat skeleton will be prevented from inadvertent disengagement by virtue of the opposing torque impressed on the adjacent rods during assembly. The flooring section is also prevented from inadvertent disengagement by virtue of the wing nut and bolt interlocking devices which may be loosened only by a manual operation, and the boat cover is also retained securely on the frame and is prevented from undesirable loosening or sagging by the action of lacings 154, rope 157 and grummets 156.

In ordinary practice I have found the inherent resilience of the materials forming the boat framework sufficient to insure proper configuration and contour of the framework when assembled. However, in using certain materials of low resilience and flexibility it is found advisable to prebend all or certain parts of the framework and my invention is intended to embrace such prebent construction.

When the boat construction is completely dismantled it will comprise a plurality of rods of substantially equal length, a plurality of transverse ribs, a plurality of floor supports, dual bow and stern blocks, a compact flooring unit, and a cover member, these parts all being designed to be arranged compactly together into a small and light-weight bundle for purposes of transportation.

It will thus be appreciated that the present invention provides a collapsible boat construction of improved strength and rigidity when assembled, of increased portability when dismantled, and which may with great ease and rapidity be assembled or dismantled. It will further be appreciated that the present invention provides a boat formed from a small number of individual units or sections, a maximum of such units or sections being readily interchangeable, and the size, shape and capacity of the assembled boat being readily altered to meet particular circumstances.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a collapsible boat, a plurality of longitudinal rib members each comprising a series of rod sections disposed end to end; a plurality of transverse rib members; a plurality of ferrules pivoted at spaced intervals along said transverse rib members for interconnecting said series of rod sections; means for pivotally retaining said ferrules in proper disposition upon said transverse rib members; auxiliary transverse rib members secured to said longitudinal rib members; longitudinal stringer members secured to said transverse rib and auxiliary members; a plurality of transverse floor supports secured to said longitudinal rib members and said stringer members; a floor section secured to said transverse rib members and said transverse floor supports; means at the bow and stern of said boat for assembling together the free ends of said longitudinal rib members; a cover; and means for mounting said cover over said longitudinal and transverse rib members.

2. In the combination described in claim 1, said means at the bow and stern of said boat for assembling together the free ends of said longitudinal rib members comprising a cluster of ferrules designed to receive said free ends and mounted within a bow or stern block; and said means for mounting said cover over said longitudinal and transverse rib members comprising grommets disposed in said cover designed for snapping over the ends of said transverse ribs extending above the gunwale, opposing grommets disposed in opposite edges of said cover, said opposing grommets being interconnected by ropes extending therebetween, decks lashed over the bow and stern of said boat, and nose pockets designed to be snapped over said bow and stern blocks.

3. In a collapsible boat, a plurality of longitudinal rib members each comprising a series of rod sections disposed end to end; a plurality of transverse rib members; a plurality of ferrules pivoted at spaced intervals along said transverse rib members for interconnecting said series of rod sections; means for pivotally retaining said ferrules in proper disposition upon said transverse rib members; longitudinal stringer members secured to said transverse rib members; a plurality of transverse floor supports secured to said stringer members; a floor section associated with said stringer members and said transverse floor support arrangement; means at the bow and stern of said boat for assembling together the free ends of said longitudinal rib members; a cover; and means for mounting said cover over said longitudinal and transverse rib members.

FLOYD T. WILCOX.